United States Patent [19]

Laas et al.

[11] Patent Number: 5,306,740
[45] Date of Patent: Apr. 26, 1994

[54] PROCESS FOR THE PRODUCTION OF BROMINATED CHLORINE-SUBSTITUTED POLY-1,3-BUTADIENE

[75] Inventors: Hans J. Laas, Cologne; Heinz W. Lucas, Bergisch Gladbach; Klaus Nachtkamp, Duesseldorf; Heinrich Königshofen, Bergisch Gladbach, all of Fed. Rep. of Germany

[73] Assignee: Bayer Aktiengesellschaft, Leverkusen, Fed. Rep. of Germany

[21] Appl. No.: 44,732

[22] Filed: Apr. 12, 1993

[30] Foreign Application Priority Data

Apr. 22, 1992 [DE] Fed. Rep. of Germany ....... 4213164

[51] Int. Cl.$^5$ ............................................. C08F 8/22
[52] U.S. Cl. ................................... 522/86; 525/337.8; 525/337.9; 525/333.1; 525/333.2; 525/356
[58] Field of Search ........................... 525/356; 522/86

[56] References Cited

U.S. PATENT DOCUMENTS 2,725,373 11/1955 Reynolds .
5,028,654 7/1991 Wuest et al. .

FOREIGN PATENT DOCUMENTS 2616994 11/1977 Fed. Rep. of Germany .
2209780 7/1974 France .
2155488A 9/1985 United Kingdom .

Primary Examiner—Bernard Lipman
Attorney, Agent, or Firm—Connolly & Hutz

[57] ABSTRACT

Brominated chlorine-substituted poly-1,3-butadiene is produced by a process in which an aqueous chlorine-substituted poly-1,3-butadiene latex is reacted in aqueous phase with a brominating agent in the presence of a radical-forming catalyst and/or in the presence of light at a pH value below 7 and at a temperature of 20° to 95° C., the brominated reaction product is optionally precipitated from the aqueous dispersion obtained and then separated from the aqueous liquid.

7 Claims, No Drawings

PROCESS FOR THE PRODUCTION OF BROMINATED CHLORINE-SUBSTITUTED POLY-1,3-BUTADIENE

This invention relates to a process for the production of brominated chlorine-substituted poly-1,3-butadiene and to its use in the production of adhesives and in the production of bonding agents for bonding rubber to metal.

Rubber/metal composites, which are presently used in many branches of industry, for example for vibration-damping elements, are generally produced by vulcanization of a rubber mixture onto a metal part coated beforehand with an adhesive (Ullmann's Encyclopedia of Industrial Chemistry, 5th Edition, 1985, Vol. A1, pages 255–256). In addition to the usual auxiliaries, suitable adhesives for bonding rubber to metals mainly contain high molecular weight, metal-bonding, generally halogenated components.

A commonly used metal-bonding component is brominated poly-2,3-dichloro-1,3-butadiene (brominated PDCB), which may be used either on its own or in admixture with other, metal-bonding, preferably chlorinated polymers, for example with after-chlorinated PVC (U.S. Pat. No. 3,826,772), chlorinated rubber or chlorinated EPDM (EP-A 337 224), synthetic or natural rubber (DE-OS 3 508 176) or even with phenolic and epoxy resins or polyisocyanates (U.S. Pat. No. 2,900,292).

The production of brominated PDCB is the subject of U.S. Pat. No. 2,725,373. According to this document, thermoplastic rubber-like products are obtained by bromination of PDCB with free bromine or with brominating agents, such as N-bromosuccinimide (NBS) for example, in organic, preferably chlorinated solvents optionally inert to bromine, for example in chloroform, tetrachloromethane, chlorobenzene or even benzene. For a bromine content of 16 to 27% by weight, these thermoplastic rubber-like products are readily soluble in typical solvents and are suitable as bonding agents for elastomers. Bromination takes place almost exclusively by substitution in the allyl position to the chlorinated double bond. Where elemental bromine is used as the brominating agent, hydrogen bromide is formed as a secondary product and has to be removed by addition of an acid-binding agent, generally an inorganic base, with corresponding salt formation.

According to the teaching of DE-OS 2 616 994, this disadvantage can be obviated by carrying out the bromination reaction in a two-phase mixture of water and one of the organic, preferably chlorinated solvents mentioned above. The hydrogen bromide formed, which dissolves in the aqueous phase, can be oxidized with suitable oxidizing agents, for example with hydrogen peroxide or organic peracids, after which the bromine reformed in this way passes into the organic phase where it is re-available as a reagent.

Both bromination processes involve the use of organic solvents which are inert under bromination conditions or function as swelling agents for PDCB or brominated PDCB. However, some of the commonly used chlorinated solvents mentioned above are suspected of being carcinogenic and, in recent years, have been the subject of public criticism in view of their potential to damage the ozone layer and their poor degradability in the environment. Their handling still entails observation of strict safety guidelines.

There is likely to be a worldwide ban on the use of tetrachloromethane, the preferred solvent for bromination reactions, in the near future.

Accordingly, the problem addressed by the present invention was to provide a process for the production of brominated PDCB in which there would be no need to use ecologically or toxicologically unsafe solvents.

This problem has been solved by the provision of the process described in detail hereinafter. This process is based on the surprising observation that acidified, chlorine-substituted poly-1,3-butadiene latices can be brominated in aqueous phase without the disperse particles coagulating or precipitating. The polymer dispersions remain stable throughout the entire reaction. The particle fineness thus guaranteed makes it unnecessary to use an organic swelling agent.

The present invention relates to a process for the production of brominated chlorine-substituted poly-1,3-butadiene which is characterized in that an aqueous chlorine-substituted poly-1,3-butadiene latex is reacted in aqueous phase with a brominating agent in the presence of a radical-forming catalyst and/or in the presence of light at a pH value below 7 and at a temperature of 20° to 95° C., the brominated reaction product is optionally precipitated from the aqueous dispersion obtained and then separated from the aqueous liquid.

The present invention also relates to the brominated chlorine-substituted poly-1,3-butadiene obtainable by this process.

Finally, the present invention also relates to the use of the brominated chlorine-substituted poly-1,3-butadiene obtainable by this process as a starting component in the production of adhesives.

Starting materials for the process according to the invention are chlorine-substituted poly-1,3-butadiene latices which may be produced in known manner by emulsion polymerization of chloroprene, 2,3-dichloro-1,3-butadiene or mixtures of these monomers, optionally in the presence of up to 20% by weight and preferably up to 10% by weight, based on the total quantity of monomers used, of copolymerizable monomers, such as mono- and di-ethylenically unsaturated compounds containing 3 to 8 carbon atoms, for example monoethylenically unsaturated aliphatic compounds, such as acrylonitrile, methacrylonitrile, α-chloroacrylonitrile, vinylidene chloride, $C_{1-4}$ alkyl acrylates or $C_{1-4}$ alkyl methacrylates, vinyl-substituted aromatic compounds, such as styrene or vinyl toluenes, dienes, such as 1,3-butadiene, 1-chloro-1,3-butadiene or 2-chloro-3-methyl-1,3-butadiene, carboxylic acids, such as acrylic acid, methacrylic acid, 2-ethyl acrylic acid, 2-propyl acrylic acid, 2-butyl acrylic acid or itaconic acid, or mixtures of these monomers.

The emulsion polymerization may be carried out in acidic or alkaline aqueous medium by typical processes, but preferably by the inflow process, the inflow process being understood to be a polymerization process in which a small portion of the reaction mixture is initially introduced and, after the beginning of polymerization, the remaining monomers are introduced continuously or in portions, optionally with more activator and emulsifier ("Ullmann's Encyclopädie der technischen Chemie", Vol. 9, pages 366 et seq., Verlag Urban und Schwarzenberg, München-Berlin, 1957; "Encyclopedia of Polymer Science and Technology", Vol. 3, pages 705 to 730, John Wiley, New York, 1965; "Methoden der organischen Chemie" (Houben-Weyl) XIV/1, 733 et seq., Georg Thieme Verlag, Stuttgart 1961).

The polymerization is preferably carried out at a pH value of 1.5 to 5 and, in a particularly preferred embodiment, at a pH value of 2 to 4.

The pH value may be adjusted by mineral acids or water-soluble organic, non-polymerizable acids. The system may be buffered for protection against unintentional shifts in pH.

Activators or activator systems are used to initiate and to sustain the polymerization reaction. Preferred activators or activator systems are hydrogen peroxide, water-soluble salts of peroxodisulfuric acid, such as potassium peroxodisulfate, organic peroxides or, in a particularly preferred embodiment, redox systems, i.e. combinations of inorganic or organic peroxo compounds with suitable reducing agents, for example the combinations potassium peroxodisulfate/sodium dithionite, ammonium persulfate/sodium hydroxymethyl sulfinate, diisopropyl hydroperoxide/hydrogen sulfide or peroxide/triethanolamine. These activators or the activator systems are generally used in quantities of 0.1 to 5 mmol and preferably in quantities of 0.2 to 4 mmol per 100 g polymerizable monomer used.

Suitable emulsifiers for the production of the chlorine-substituted poly-1,3-butadiene latices used as starting components in the process according to the invention are, basically, anionic, cationic, amphoteric or nonionic emulsifiers which are described, for example, in "Methoden der organischen der Chemie" (Houben-Weyl), Vol. XIV/1, 190 et seq., Georg Thieme Verlag, Stuttgart 1961, or mixtures of these emulsifiers.

Suitable anionic emulsifiers are, for example, alkylaryl sulfonates containing 8 to 18 carbon atoms in the alkyl radical, $C_{8-18}$ alkyl sulfates and sulfonates, sulfonated succinic acid esters, sulfonated, sulfated or phosphated addition products of alkylene oxide (more particularly ethylene and, optionally, propylene oxide) with $C_{8-12}$ alkylphenols and water-soluble naphthalene sulfonic acid/formaldehyde condensates.

These emulsifiers generally contain sodium, potassium or ammonium ions as cations.

Other suitable anionic emulsifiers are the salts of the diterpene carboxylic acids obtained from tall oil, pine balsam and wood rosin and, more particularly, disproportionation, partial hydrogenation and polymerization products of these diterpene carboxylic acids (W. Barendrecht, L. T. Lees in Ullmann's Encyclopädie der technischen Chemie, 4th Edition, Vol. 12, Verlag Chemie, Weinheim/New York 1976, pages 528–538).

Suitable cationic emulsifiers are, for example, amine salts, quaternary ammonium and pyridinium salts, for example of dodecyl amine, of esterification products of paraffin fatty acid and dimethyl aminoethanol, of condensation products of oleic acid and N,N-diethyl ethylenediamine, of reaction products of primary amines with bis-(2-chloroethyl)-ether or 2-chloro-2'-hydroxydiethyl ether, cetyl pyridinium chloride, lauryl pyridinium sulfate or salts of hydrogenated or dehydrogenated abietyl amines.

Suitable nonionic emulsifiers are polyadducts based on ethylene oxide and/or propylene oxide.

Anionic emulsifiers are preferably used in the production of the poly-1,3-butadiene latices used as starting materials in the process according to the invention. Sulfonated, sulfated or phosphated adducts of alkylene oxides with $C_{8-12}$ alkylphenols and water-soluble naphthalene sulfonic acid/formaldehyde condensates are particularly preferred.

The emulsifiers are generally used in quantities of 0.1 to 5.0% by weight and preferably in quantities of 1.0 to 3.0% by weight, based on the mixture of the monomers to be polymerized.

The production of the poly-1,3-butadiene latices used as starting materials in the process according to the invention may optionally be carried out in the presence of so-called molecular weight regulators or "regulators" for short (cf. "Methoden der organischen Chemie" (Houben-Weyl), 4th Edition, Vol. 14/1, Georg Thieme Verlag, Stuttgart 1961, pages 197 et seq., more particularly pages 318 et seq.).

Suitable regulators are, for example, $C_{8-18}$ alkyl mercaptans such as, for example, octyl mercaptan, linear or branched dodecyl mercaptan, tridecyl mercaptan or mixtures thereof, di-$C_{4-20}$-alkyl xanthogene disulfides containing linear, branched or cyclic alkyl radicals, such as for example ethyl xanthogene disulfide, isopropyl xanthogene disulfide or bis-(methylene trimethylol propane)-xanthogene disulfide, polysulfides, or haloforms, such as iodoform. The molecular weight and gel content of the latices may be influenced by the regulators, the gel content being understood to be that percentage of a latex which is insoluble in tetrahydrofuran at 25° C. (leave 250 mg sample standing in 25 ml THF for 24 hours, centrifuge, dry at 70° C. to constant weight).

The regulators are optionally used in quantities of 0.1 to 10% by weight and preferably in quantities of 0.3 to 6% by weight, based on the quantity of monomers to be polymerized.

Preferred starting materials for the process according to the invention are poly-2,3-dichloro-1,3-butadiene latices, which can be obtained by emulsion polymerization of 2,3-dichloro-1,3-butadiene as monomer, the ammonium salt of a sulfated ethoxylated nonylphenol and the sodium salt of the formaldehyde condensation product of β-naphthalene sulfonic acid as emulsifier, n-dodecyl mercaptan as regulator and potassium peroxodisulfate, sodium dithionite and sodium β-anthraquinone sulfonate as activator by the inflow process, a quantity of generally less than 30% by weight and preferably less than 10% by weight of the monomer being initially introduced with less than 30% by weight and preferably less than 20% by weight of the emulsifier into more than 50% by weight of the quantity of water and reacted to a conversion of more than 70% and preferably more than 95% by subsequent addition of regulator, emulsifier solution, monomer and activator at a pH value below 7 and preferably in the range from 2 to 4 and at a temperature of 10° to 40° C.

Particularly preferred poly-2,3-dichloro-1,3-butadiene latices have a gel content of less than 5% by weight.

Elemental bromine is generally used as brominating agent in the process according to the invention, being used in quantities of 5 to 150% by weight and preferably in quantities of 12 to 85% by weight, based on the solids content of the starting latex used.

Other suitable, albeit less preferred, brominating agents are reagents which are capable of releasing bromine in situ, for example mixtures of alkali metal bromides and bromates, which react to form bromine at an acidic pH, or even water-soluble or water-miscible ammonium perbromides.

To accelerate the reaction, the process according to the invention is carried out in the presence of radical-forming catalysts and/or in the presence of light.

Suitable catalysts are, in particular, inorganic or organic peroxo or azo compounds which are soluble in water or, optionally, co-emulsifiable in a PDCB latex and which are capable of thermolytically or photolytically releasing radicals and thus initiating the bromination reaction. Examples of such catalysts are hydrogen peroxide, organic hydroperoxides, such as for example tert. butyl hydroperoxide or cumene hydroperoxide, peroxides, such as for example ditert. butyl peroxide, dicumyl peroxide or butanone peroxide, diacyl peroxides, such as for example diacetyl peroxide, dilauroyl peroxide or benzoyl peroxide, peroxycarboxylic acids and esters thereof, such as for example perbenzoic acid, m-chloroperbenzoic acid or perbenzoic acid tert. butyl ester, aliphatic azo compounds, such as for example azo-bis-isobutyronitrile or azo-bis-cyclohexane nitrile.

The reaction mixture may be exposed to light either from outside or by means of a submerged lamp. Basically, light having a wavelength of less than 620 nm is suitable for this purpose.

The process according to the invention is preferably carried out in the presence of radical-forming catalysts.

It is particularly preferred to use hydrogen peroxide or water-soluble organic hydroperoxides.

The catalysts suitable for the process according to the invention are generally used in a quantity of 1 to 50 mol-% and preferably in a quantity of 5 to 40 mol-%, based on the quantity of bromine used.

To carry out the process according to the invention, the chlorine-substituted poly-1,3-butadiene latex used as starting material is optionally adjusted to a pH value below 7 and preferably in the range from 0 to 4 with dilute hydrochloric acid and reacted while stirring with elemental bromine and a radical-forming catalyst, optionally in the presence of light, at a temperature of 20° to 95° C. and preferably at a temperature of 40° to 80° C. until the disappearance of the brown coloration typical of bromine indicates the reaction is complete.

The brominated reaction product can be precipitated from the dispersion obtained by suitable methods, for example by salting out or by addition of an alcohol, subsequently separated from the aqueous liquid and dried.

In another, albeit less preferred, embodiment of the process according to the invention, the reaction with bromine is carried out in the absence of a catalyst, i.e. solely by exposing the reaction mixture to light.

It is of course also possible in the process according to the invention, as described in DE-OS 2 616 994 for two-phase mixtures, to reoxidize the hydrogen bromide formed during the bromination reaction to bromine using suitable oxidizing agents, for example hydrogen peroxide, and thus to return it to the reaction which provides for substantially quantitative utilization of the bromine.

The products obtained by the process according to the invention are beige to brown solids having bromine contents of 3 to 42% by weight and preferably 10 to 30% by weight. They are valuable starting components in the production of adhesives and may be applied both in the form of the aqueous dispersions initially obtained in the process according to the invention and from organic solution. The process products according to the invention obtainable from the poly-2,3-dichloro-1,3-butadiene latices preferably used as starting compound in the process according to the invention are eminently suitable in particular for the production of binders for bonding rubber to metals.

The invention is illustrated by the following Examples in which all percentages are by weight, unless otherwise indicated.

EXAMPLE 1 (PRODUCTION OF PDCB LATEX)

162 g water, 3.75 g 10% aqueous sulfuric acid and 4.5 g 2,3-dichlorobutadiene are introduced into a reactor. An emulsifier solution is prepared from 135 g water, 9.75 g of a 30% aqueous solution of an ammonium salt of a sulfated ethoxylated nonylphenol containing on average four ethoxy groups per molecule, 0.5 g of the sodium salt of the formaldehyde condensation product of $\beta$-naphthalene sulfonic acid and 0.025 g sodium $\beta$-anthraquinone sulfate.

After 14.5 g of this emulsifier solution have been added to the contents of the reactor, 8 g n-dodecyl mercaptan are added to the remaining emulsifier solution (inflow 1). A solution of 0.9 g sodium dithionite in 12.5 g water is prepared and adjusted to pH 10.5 with 5% KOH (inflow 3).

A solution of 0.4 g potassium peroxodisulfate in 12.5 parts water is prepared (inflow 4). The reactor is adjusted to 25° C. and nitrogen is passed through for 30 minutes. To initiate the reaction, 1 g inflow 3 and 0.6 g inflow 4 are added. The inflows are then started:

| Inflow 1 | 34.6 g/h |
|---|---|
| 2,3-dichlorobutadiene | 31.8 g/h |
| Inflow 3 | 3.5 g/h |
| Inflow 4 | 3.5 g/h |

On completion of all the inflows (240 minutes), a solution of 0.15 g sodium dithionite in 3 g water is added.

The latex is filtered and adjusted to pH 7 with 10% KOH and excess monomer is removed by stripping with steam.

The solids content after polymerization is 25% and the conversion >99%.

EXAMPLE 2

1.9 g of an oleyl-alcohol-started polyethylene oxide polyether are added as emulsifier to 150 g of the PDCB latex described in Example 1 and, after the pH has been adjusted to approx. 1 with 200 ml 1N hydrochloric acid, the mixture is heated to 70° C. 20 g elemental bromine are then added dropwise with stirring and, at the same time, 15 g of a 28% aqueous solution of tert. butyl hydroperoxide are added over a period of 30 minutes, followed by stirring for 5 h at 70° C. After cooling to room temperature, the product is precipitated by addition of 400 ml methanol, filtered under suction, washed with methanol and dried in a drying cabinet at 50° C.

A beige-brown powder completely soluble in toluene is obtained. The powder has the following composition:

| C: | 31.8% |
|---|---|
| H: | 2.6% |
| O: | 0.2% |
| Br: | 19.4% |
| Cl: | 45.6% |

EXAMPLE 3

1 9 g of an oleyl-alcohol-started polyethylene oxide polyether are added as emulsifier to 150 g of the PDCB latex described in Example 1 and, after adjustment to a pH of approx. 1 with 200 ml 1 N hydrochloric acid, the mixture is heated to 70° C. 15 g elemental bromine are then added dropwise with stirring and, at the same time, 15 g of a 28% aqueous solution of tert. butyl hydroperoxide are added over a period of 30 minutes, followed by stirring for 2.5 h at 70° C.

After addition of 21.0 g of a 10% hydrogen peroxide solution, the mixture is stirred for another 4 h at 70° C. and left to cool to room temperature and the product is precipitated with 400 ml methanol. A yellow-brown powder having the following composition is obtained after filtration under suction, washing with methanol and drying at 50° C.:

| | |
|---|---|
| C: | 31.8% |
| H: | 2.8% |
| O: | 1.2% |
| Br: | 20.1% |
| Cl: | 43.8% |

The product is completely soluble in standard solvents, such as toluene or xylene, and is film-forming.

We claim:

1. A process for the production of brominated chlorine-substituted poly-1,3-butadiene, characterized in that an aqueous chlorine-substituted poly-1,3-butadiene latex is reacted in aqueous phase with a brominating agent in the presence of a radical-forming catalyst and/or in the presence of light at a pH value below 7 and at a temperature of 20° to 95° C., the brominated reaction product is optionally precipitated from the aqueous dispersion obtained and then separated from the aqueous liquid.

2. A process as claimed in claim 1, characterized in that an aqueous poly-2,3-dichloro-1,3-butadiene latex is used as the aqueous chlorine-substituted poly-1,3-butadiene latex.

3. A process as claimed in claim 1, characterized in that elemental bromine is used as the brominating agent.

4. A process as claimed in claim 1, characterized in that a water-soluble, organic or inorganic peroxide or hydroperoxide is used as the radical-forming catalyst.

5. A process as claimed in claim 1, characterized in that hydrogen peroxide or tert. butyl hydroperoxide is used as the radical-forming catalyst.

6. A process as claimed in claim 1, characterized in that the reaction is carried out at a pH value of 0 to 4.

7. A process as claimed in claim 1, characterized in that the reaction is carried out at a temperature of 40° to 80° C.

* * * * *